Patented May 17, 1949

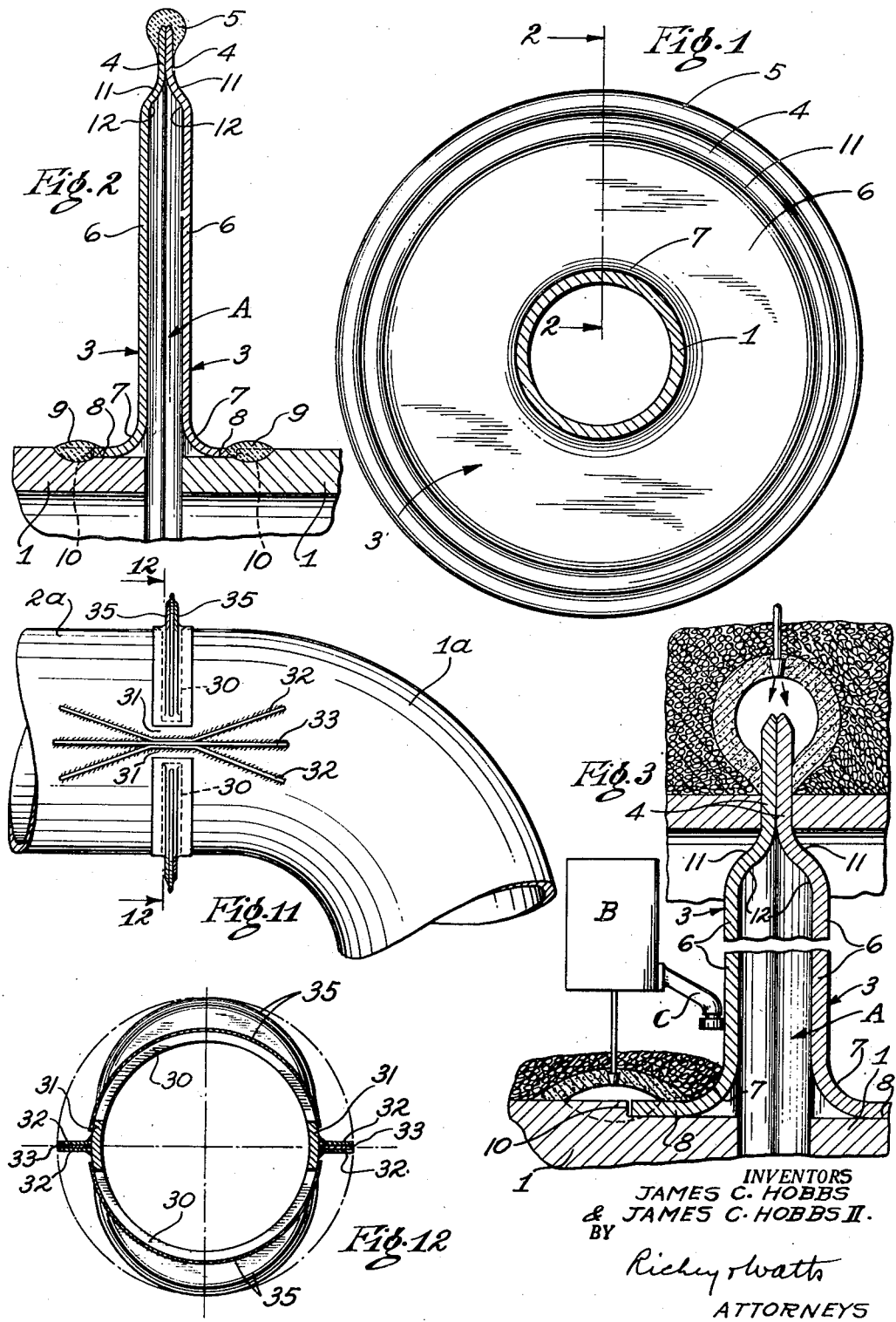

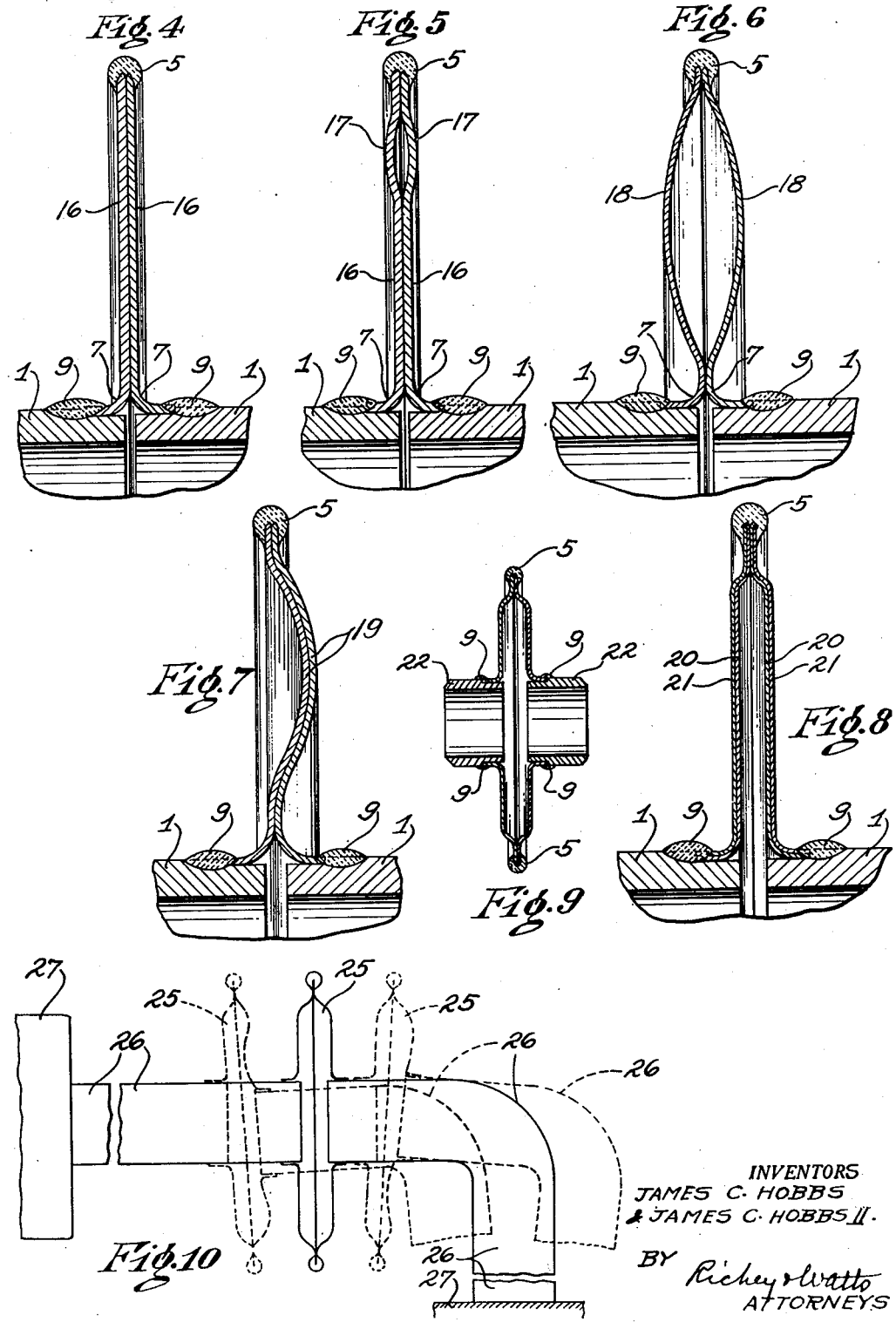

2,470,167

UNITED STATES PATENT OFFICE 2,470,167

EXPANSION FLANGE

James C. Hobbs, Painesville, Ohio, and James C. Hobbs, II, Oil City, Pa.

Application August 31, 1945, Serial No. 613,808

5 Claims. (Cl. 285—90)

1

The present invention relates generally to expansion joints and particularly to flexible joints which will permit limited relative movement of pipes associated therewith.

Metal pipes, when subjected to various or varying temperatures and when connected to fixed objects at their remote ends, must be provided with means for accommodating changes in their lengths due to variations of temperatures. Slip-joints have been proposed for this purpose but are not entirely satisfactory for the danger of leakage of fluids thru the joint is ever present and relative movement of the pipes is impelled or prevented when the pipes are deflected out of true axial alignment. Various and numerous other expedients have been proposed from time to time as possible solutions of this long-standing and troublesome problem but, as far as I know, none of these proposals has been entirely satisfactory.

The present invention has solved this problem, as is evidenced by the fact that many thousand devices embodying the present invention have gone into satisfactory and successful commercial use. This invention provides simple apparatus readily and inexpensively constructed and consisting of a minimum number of parts. Briefly described, an article embodying the present invention comprises two flexible, thin, metal rings which are so connected to the outer surfaces of spaced apart pipe ends and to each other as to permit limited movement of the pipes relative to each other along or at angles to their common longitudinal axis.

The present invention will be better understood by those skilled in the art from the following description and from the drawings which accompany this specification and in which, Fig. 1 is a transverse, sectional view thru a pipe equipped with an expansion joint embodying the present invention;

Fig. 2 is a central, longitudinal, sectional view taken on line 2—2 of Fig. 1;

Fig. 3 is a diagrammatic view showing means for welding the rings of Figs. 1 and 2 together at their outer peripheries and to pipes at their inner peripheries;

Figs. 4, 5, 6, 7 and 8 are views similar to Fig. 2 but showing modified forms of expansion joints embodying the present invention;

Fig. 9 is a view similar to Fig. 2 but showing an expansion joint unit comprising flexible rings and short lengths of pipes;

Fig. 10 is a diagrammatic view showing the operation of a joint of this invention near a bend in a pipe line;

Fig. 11 is a fragmentary side elevational view of a modified form of the invention; and, Fig. 12 is a sectional view taken on line 12—12 of Fig. 11.

2

In Figs. 1 and 2, pipes 1 are disposed with their longitudinal axes in a common line and with their adjacent ends spaced a short distance apart. These pipes are connected by an expansion joint A which comprises two metal plates or rings 3. These rings consist of thin, flexible, metal, have outer peripheral portions 4 which engage each other and are connected together by weld metal 5, have body portions 6 which are spaced apart a short distance, have curved portions 7 near their inner peripheries, and have opposite, axially extending flanges 8 which surround and engage the outer surfaces of the ends of pipes 1 and are connected thereto by welds 9. Rings 3 are disposed substantially at right angles to the longitudinal center line of pipes 1 and flanges 8 are disposed substantially at right angles to the body portions 6 of the rings 3.

Preferably, the outer surfaces of pipes 1 are cut away to provide annular shoulders 10 against which the edges of flanges 8 may engage and be positioned preliminary to formation of the welds 9.

While rings 3 may be of different sizes and dimensions, as those skilled in the art will understand, an illustration setting forth one set of dimensions will be given. Assuming that the radial length of rings 3 is approximately three inches and the pipes 1 will move toward and away from each other to the extent of up to about ½", the rings may consist of about 16 gage (.062") low carbon steel, the radii of the curved portions 7 and the curved portions indicated at 11 and 12 may be about ⅛", and the axial length of flanges 8 from their junction with curved portions 7 may be about $\tfrac{7}{16}$", with shoulders 10 being about ⅜" from the ends of their pipes and from the projection of the inner surfaces of the rings 3.

It will be noted from Figs. 1 and 2 that the weld joint 5 comprises weld metal which is greater in minimum dimensions than the thickness of the combined rings 3. This metal is also characterized by having greater strength than that of the rings. In other words, weld metal 5 is stronger and greater in thickness than the rings 3 and will withstand forces which might not be withstood by rings 3. Thus, adequate strength is afforded by weld metal 5.

It will also be noted that welds 9 are formed mainly in the relatively thick walls of pipes 1, are greater in dimensions than the wall thickness of flanges 8, and are disposed at the edges of those flanges. This weld metal is also characterized by having greater tensile strength than that of the flanges.

Since the flanges are connected at their edges to the pipes and are connected to the body portions of the rings by curved portion 7, forces created by relative movement of pipes 1 and applied to rings 3 will be distributed thru welds 9, flanges 8, curved portion 7, body portion 6 and curved portions 11 and 12. As a result, most of the forces applied to the rings 3 by relative movement of the pipes 1 will be dissipated in and absorbed by the rings and only limited amounts of such forces will be distributed to and absorbed by weld metal 5 which, however, is of adequate strength to resist separation of the peripheral portions 4 of the rings due to the application of such forces. Movement of the rings away from each other produces a bending of curved portions 7 which are spaced outwardly from the pipes and puts the weld metal under compression, while movement of the rings toward each other also puts the weld metal under compression. Since the weld metal is thicker than the ring and the metal is stronger in compression than in tension, the weld metal is considerably stronger than the ring under service conditions.

Apparatus which has been found to be satisfactory in making the expansion joint of Figs. 1 and 2 is illustrated diagrammatically in Fig. 3. There a jig is clamped against the outer surfaces of peripheral portions 4 of two assembled rings 3 and a quantity of granular flux is placed in the clamp and covers the outer edges of rings 3. Preferably, each of these edges is beveled so as to leave a small V-shaped depression therebetween. When an arc is drawn between an electrode and the outer edges of rings 3, the granular flux is melted in the vicinity of these edges and molten metal attaches to and builds up about the edges, the flux acting as a dam which confines the weld metal to the edge portions of the rings and produces a weld which is more or less circular or C-shaped in transverse cross-section and extends radially along the sides of flat portions 4 of the rings. This weld metal 5 not only unites the rings and clamps them against each other, but is compressed when forces are exerted on the rings to move them toward or away from each other. This weld metal is, therefore, much stronger than the rings under service conditions.

Fig. 3 also shows means for forming welds 9. An automatic traveling welder B is positioned to draw an arc from the outer surface of pipe 1 a short axial distance from the end of flange 8, the arc being covered with granular flux, part of which melts due to the heat of the arc and acts as a dam for the molten metal in the manner above described. A guide C connected to welder B is positioned to engage against the outer surface of body portion 6 of the ring and maintain the welder a predetermined distance away therefrom and thus maintain the arc in such a position relative to the edge of flange 8 as will insure that the weld metal does not extend along flange 8 and onto or close to portion 7, where it might decrease the amount of flexibility of that portion and hence tend to concentrate in other certain portions of the ring an abnormal amount of the forces applied to the rings by relative movements of pipes 1.

The expansion joint of Fig. 4 is quite similar to that of Figs. 1 and 2, but the ends of the pipe are shown close together in the position they would occupy under the maximum temperatures to which the pipes would be subjected in use and the body portions of the rings are in substantial contact thruout their radial extent.

The joint of Fig. 5 is quite like that shown in Fig. 4, but in this instance part of the body portions 16 are bowed outwardly away from each other as is indicated at 17.

The joint of Fig. 6 resembles that of Figs. 1 and 2 but the body portions of the ring are bowed outwardly from each other, as at 18, from adjacent to weld 5 to adjacent to curved portion 7.

The joint of Fig. 7 is similar to that of Fig. 4 but, in this instance, the body portions of the rings are curved in the same direction, as is indicated at 19.

In Fig. 8 each ring consists of two metal plies 20 and 21 instead of a single thickness of metal in ring 3 of Fig. 2. A joint of this construction is stronger than one in which single plies are used and yet is more flexible than if the thickness of metal in the two plies were present in a single ply. More than two plies may be used if desired.

It will be understood that the rings of any of the above described joints may be connected at their peripheries as by weld 5 and sold as an article of commerce for subsequent attachment to pipes by welds 9. Alternatively, as is shown in Fig. 9, such an assembly may be welded to two short lengths of pipe and the resulting article sold as an article of commerce. In this instance the rings 3 are connected at their outer peripheries by metal 5 and at the edges of their inner peripheral flanges are connected by welds 9 to the adjacent ends of short pipe sections 22. The remote ends of pipe sections 22 may be welded or otherwise connected to adjacent pipe ends.

In Fig. 10 an expansion joint 25 embodying the present invention is shown connected to pipes 26 near a bend in one of these pipes. The remote ends of the pipes are connected to fixed pieces of apparatus 27. When the temperature decreases and thereby causes contraction of pipes 26, these pipes may take a position represented by the left-hand dotted line on the figure, and when the temperature rises and the pipes expand the position of the pipes may be represented by the right-hand dotted lines, the full lines indicating the position of the pipes when the temperature is about midway between these extremes. Such deflection and change of position in pipes 26 is permitted by joint 25. This deflection is the resultant of forces tending to move the pipe ends along a common axis and also along axes at right angles to each other. Each of the rings 3 permits both the coaxial and right angular movement by deflection of the body portions of the rings toward one another on one side of the pipes and away from one another on the other side of the pipes. In other words, relative movement of the pipes along a common axis tends to move the body portions of the rings toward and away from each other more or less equally all the way around the ring, while relative movement of the pipes along axes at an angle to each other results in a movement of a portion of the body of one ring toward the other ring and a corresponding movement of the other portion of the first ring away from the other ring, that is, instead of the rings maintaining their parallelism to each other they become inclined to each other.

The flexibility is quite desirable, particularly in instances such as is depicted in Fig. 10.

It will be understood from the foregoing description that expansion joints embodying the present invention may be readily and inexpensively constructed. The rings may be stamped from sheet metal stock, and a joint, consisting of two rings and weld 5, may be prefabricated with or without being attached to short pipes, as is shown in Fig. 9. The expense of cutting away the outer surfaces of the pipe ends to receive the flanges of the rings is readily and inexpensively performed and the shoulders provided thereby to serve as means for accurately positioning the rings on the pipes preliminary to connecting them as by welds 9. Since the rings are made from thin metal they are light in weight and easy to handle and ship. They do not occupy much space and are of decided advantage where space is at a premium. These joints are leak-proof and hence may be used with fluids at pressures above or below atmospheric without danger of leakage of such fluids. This is an advantage of considerable importance, particularly where poisonous gases are being handled. Since the rings are made of thin, flexible, metal and forces are distributed thruout the rings, the joint is strong and flexible and can withstand considerable bending due to deflection of the pipes to which they are attached. Since the welded joints consist of a large mass of metal, there is substantially no danger of burning thru the thin metal of the rings when welding them, and since the welds which connect the rings to the pipes are made on heavy sections of the pipe, there is no danger of burning thru the rings and no need to use backing up rings during the formation of the welds.

In Figs. 11 and 12 the pipe ends 1a and 2a are spaced apart by two circumferentially extending slots or apertures 30 and are connected together at the ends of the slots by integral portions or welds 31. Tie bars 32 and 33 extend along and are welded to the outside of pipes 1a and 2a and portions 31. Expansion joints are connected to the pipes along each aperture 30. Each of these joints consists of a pair of sector-shaped plates 35 having flanges welded to the pipes opposite of and enclosing an aperture 30 and welded together at their outer edges. These joints resemble the previously described joints, for example, that of Fig. 1, but the plates are not rings and the adjacent ends of a pair of the plates are welded to pipe portions 31 at the adjacent ends of the associated aperture 30 to enclose the latter.

In Figs. 11 and 12 the portions 31 are of sufficient circumferential length to resist axial forces when reinforced by bars 32 and 33 and are located where the bending motion is at a minimum. The sector-shaped plates 35 are of greatest radial length where the relative movement of the pipe is greatest during bending, that is, on a diameter at right angles to the diameter passing thru pipe portions 31, and the radial length of plates 35 progressively decreases from that maximum to a minimum near the ends of apertures 30.

The sector-shaped plates contain less metal than complete rings and thus make possible light weight joints. Since the two pairs of plates are not connected together each pair may expand or contract without applying forces to the other pair.

Expansion joints of the present invention have been found to meet satisfactorily specifications which call for no leakage, whereas no other joint with which we are familiar has been able to meet these specifications.

Having thus described our invention so that others skilled in the art may be able to understand and practice the same, we state that what we desire to secure by Letters Patent is defined in what is claimed.

What is claimed is:

1. A flexible pipe connection comprising flexible, thin, metal plates clamped in face to face contact and welded together at their outer peripheries by an annulus of weld metal C-shaped in transverse cross-section and having opposite, axially extending flanges at their inner peripheries to engage with and be connected to the outer surfaces of two adjacent pipe ends.

2. A flexible pipe connection comprising flexible, thin, metal rings having outer peripheral portions whose opposed side surfaces engage each other and whose edges are welded together and having opposite spaced apart bodies curving outwardly and terminating in axially extending flanges at their inner peripheries to engage with and be welded to the outer surfaces of two adjacent pipe ends.

3. A flexible pipe connection comprising flexible, thin, metal rings having opposite, axially extending flanges at their inner peripheries to engage with and be connected to the outer surfaces of two adjacent pipe ends, curved portions connected to said flanges, bodies connected to said curved portions and having radial lengths several times the axial length of said flanges and outer peripheries clamped and welded together by annular weld metal C-shaped in transverse cross-section.

4. A flexible pipe connection comprising flexible, thin, metal rings having opposite, axially extending flanges at their inner peripheries to engage with and be welded to the outer surfaces of two adjacent pipe ends, curved portions connected to said flanges, bodies connected to said curved portions and extending at substantially right angles to said flanges and of greater radial length than the axial length of said flanges, said bodies being spaced apart for a portion of their radial length and having the opposed side surfaces of their outer peripheral portions engaging each other and said portions being connected to each other by annular weld metal C-shaped in transverse cross-section.

5. A flexible connection between pipe ends which comprises circumferentially short, diametrically opposite metal means connecting adjacent spaced apart pipe ends and of sufficient strength to resist forces applied axially to said pipes, and flexible means including sector-shaped, thin, metal plates arranged in pairs, each pair of plates being connected together at their outer peripheries and having inner peripheries connected to the pipe ends adjacent to the edges of a circumferential space between the pipe ends on one side of said metal means.

JAMES C. HOBBS.
JAMES C. HOBBS, II.

REFERENCES CITED

The following references are of record in the file of this patent:

UNITED STATES PATENTS

| Number | Name | Date |
| --- | --- | --- |
| 1,197,496 | Jobling | Sept. 5, 1916 |
| 1,732,721 | Horine | Oct. 22, 1929 |
| 1,837,490 | Stresan | Dec. 22, 1931 |
| 2,209,325 | Dennis | July 30, 1940 |
| 2,282,354 | Gunn | May 12, 1942 |
| 2,352,038 | Tolke | June 20, 1944 |